(12) United States Patent
Chan

(10) Patent No.: US 8,165,133 B2
(45) Date of Patent: Apr. 24, 2012

(54) PHYSICAL LAYER DEVICE WITH INTEGRATED SWITCH

(75) Inventor: Kevin Tunghai Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 846 days.

(21) Appl. No.: 11/785,713

(22) Filed: Apr. 19, 2007

(65) Prior Publication Data

US 2008/0151930 A1 Jun. 26, 2008

Related U.S. Application Data

(60) Provisional application No. 60/876,579, filed on Dec. 22, 2006.

(51) Int. Cl.
*H04L 12/28* (2006.01)
(52) U.S. Cl. ............... 370/395.5; 370/395.1; 370/394; 370/389; 370/351; 370/463; 710/62; 710/63; 710/303; 710/305
(58) Field of Classification Search .............. 370/463, 370/445, 419, 395, 395.5; 710/303
See application file for complete search history.

(56) References Cited

U.S. PATENT DOCUMENTS

| | | | |
|---|---|---|---|
| 5,249,183 | A | 9/1993 | Wong et al. |
| 5,818,426 | A | 10/1998 | Tierney et al. |
| 6,112,273 | A | 8/2000 | Kau et al. |
| 6,504,851 | B1 | 1/2003 | Abler et al. |
| 6,507,591 | B1 * | 1/2003 | Bray ........................... 370/501 |
| 6,665,163 | B2 | 12/2003 | Yanagisawa |
| 6,813,729 | B1 * | 11/2004 | Tsang et al. .................... 714/43 |
| 6,900,686 | B1 | 5/2005 | Roo |
| 6,965,787 | B2 | 11/2005 | Kindo et al. |
| 6,981,174 | B1 | 12/2005 | Hanning |
| 7,107,380 | B1 * | 9/2006 | Mohan ........................ 710/303 |
| 7,200,153 | B2 | 4/2007 | Feuerstraeter et al. |
| 7,218,566 | B1 | 5/2007 | Totolos, Jr. et al. |
| 7,271,641 | B1 | 9/2007 | Roo |
| 7,484,026 | B2 | 1/2009 | Burnham et al. |
| 2002/0010818 | A1 | 1/2002 | Wei et al. |
| 2002/0165961 | A1 | 11/2002 | Everdell et al. |
| 2003/0048794 | A1 | 3/2003 | Sato et al. |
| 2003/0108032 | A1 | 6/2003 | Kato |

(Continued)

FOREIGN PATENT DOCUMENTS

EP 1 536 343 A2 6/2005

(Continued)

OTHER PUBLICATIONS

Agere systems, ET2008-30, Gigabit Ethernet Octal Switch and PHY, Feb. 2006.*

(Continued)

*Primary Examiner* — Hassan Phillips
*Assistant Examiner* — Gautam Sharma
(74) *Attorney, Agent, or Firm* — Sterne, Kessler, Goldstein & Fox, P.L.L.C.

(57) ABSTRACT

Switching between communication ports of a notebook is typically accomplished using an off-chip local area network (LAN) switch or an off-chip high speed analog multiplexer. This off-chip component is disadvantageous for several reasons, including: added cost of an additional component; increased overall power consumption because transmit amplitude loss; and reduced cable reach and link performance due to hybrid mismatch and signal distortions. To reduce cost and preserve electrical and networking performance, an integrated switch is provided to multiplex signals of a networking communication chip to multiple network paths.

20 Claims, 6 Drawing Sheets

U.S. PATENT DOCUMENTS

| | | |
|---|---|---|
| 2003/0145148 A1* | 7/2003 | Zhang et al. .................. 710/305 |
| 2003/0210779 A1 | 11/2003 | Bremer et al. |
| 2004/0029620 A1 | 2/2004 | Karaoguz |
| 2004/0081089 A1* | 4/2004 | Ayyagari et al. ............. 370/229 |
| 2004/0095118 A1 | 5/2004 | Kernahan |
| 2004/0240486 A1* | 12/2004 | Venkatesh et al. ........... 370/537 |
| 2005/0083751 A1 | 4/2005 | Fujiu et al. |
| 2005/0097218 A1* | 5/2005 | Sultenfuss et al. ........... 709/238 |
| 2005/0114581 A1* | 5/2005 | Azadet et al. ................. 710/305 |
| 2005/0128056 A1* | 6/2005 | Browning ............... 340/286.02 |
| 2006/0033626 A1 | 2/2006 | Collins |
| 2006/0077276 A1 | 4/2006 | Noguchi |
| 2006/0104017 A1 | 5/2006 | Chang et al. |
| 2006/0104303 A1* | 5/2006 | Makineni et al. ............ 370/463 |
| 2006/0176088 A1 | 8/2006 | Fujiu et al. |
| 2006/0209875 A1* | 9/2006 | Lum et al. .................... 370/445 |
| 2006/0269001 A1* | 11/2006 | Dawson et al. .............. 375/257 |
| 2007/0140424 A1 | 6/2007 | Serceki |
| 2007/0165663 A1* | 7/2007 | Aloni et al. .................. 370/420 |
| 2008/0031270 A1 | 2/2008 | Tran et al. |
| 2008/0151930 A1* | 6/2008 | Chan ............................ 370/463 |
| 2008/0165794 A1* | 7/2008 | Sutardja et al. .............. 370/420 |
| 2008/0178304 A1 | 7/2008 | Jeansonne et al. |
| 2008/0266089 A1 | 10/2008 | Haren et al. |
| 2008/0278894 A1 | 11/2008 | Chen et al. |
| 2010/0234099 A1 | 9/2010 | Rasmussen et al. |

FOREIGN PATENT DOCUMENTS

| | | |
|---|---|---|
| KR | 2003-0060369 | 7/2003 |

OTHER PUBLICATIONS

European Search Report dated May 27, 2008.
Seth Prentice: "LAN Switch Eliminates Redundant PHY Chip," ELECTRONICSDESIGN.COM, Mar. 31, 2003.
Agere Systems: "ET2008-30 Gigabit Ethernet Octal Switch and PHY," Product Brief, Feb. 2006.
Abstract of Korean Patent No. 2003-0060369.
U.S. Patent & Trademark Office. Mail Stop PCT, Attention: ISA/US. PCT International Search Report dated Feb. 4, 2008. International Application No. PCT/US07/17256. International Filing Date: Aug. 2, 2007. 4 pages.
U.S. Patent & Trademark Office. Mail Stop PCT, Attention: ISA/US. PCT Written Opinion of the International Searching Authority dated Feb. 4, 2008. International Application No. PCT/US07/17256. International Filing Date: Aug. 2, 2007. 6 pages.

* cited by examiner

PHYSICAL LAYER DEVICE WITH INTEGRATED SWITCH

CROSS REFERENCE TO RELATED APPLICATIONS

This application claims the benefit of U.S. Provisional Application No. 60/876,579 filed Dec. 22, 2006, which is incorporated herein by reference in its entirety.

FIELD OF THE INVENTION

The present invention relates to a data switch.

BACKGROUND OF THE INVENTION

Portable devices such as notebooks, personal digital assistants (PDA), and mobile phones are usually designed to operate in multiple networking environments. For example, a notebook usually has multiple means of connecting to a network. Depending on the environment, the user of the notebook may opt to connect to a network wirelessly, using IEEE 802.11 or HomeRF wireless communication standard. The user may also opt to connect to the network using a more secure connection such as a direct wire connection to a local area network (LAN) using an unshielded twisted pair (UTP) cable terminated with a RJ-45 plug (RJ-45 Cable), for example.

To enable connection flexibility and portability, notebooks must be designed with the ability to switch from one type of network connection to another, such as from a wireless connection to a wire connection, or from one network communication port to another network communication port. Notebooks typically have multiple network communication ports such as an 802.11 wireless communication port, a RJ-45 compatible network port, and a docking station network port. Conventionally, a notebook is switched to operate with the RJ-45 network port or the docking station port by using an off-chip local area network (LAN) switch or an off-chip high speed analog multiplexer, which is located between the output of the notebook's physical layer device (PHY) and the RJ-45 and docking station ports. In other words, the LAN switch is separate and distinct from the PHY chip. Although the example above relates to notebooks, other types of devices (e.g., desktop and other portable devices) with networking ability may encounter the same issues.

This extra hardware between the notebook's PHY and the network communication ports is disadvantageous for several reasons, including: added cost of additional components; increased overall power requirements because of the extra components and higher PHY power that is needed to offset transmit amplitude loss; and reduced cable reach and link performance due to hybrid mismatch and signal distortions. Accordingly, what is needed is a gigabit controller without the above disadvantages.

BRIEF DESCRIPTION OF THE DRAWINGS/FIGURES

The present invention is described with reference to the accompanying drawings.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art will recognize that other configurations and procedures may be used without departing from the spirit and scope of the invention.

Figure 1:
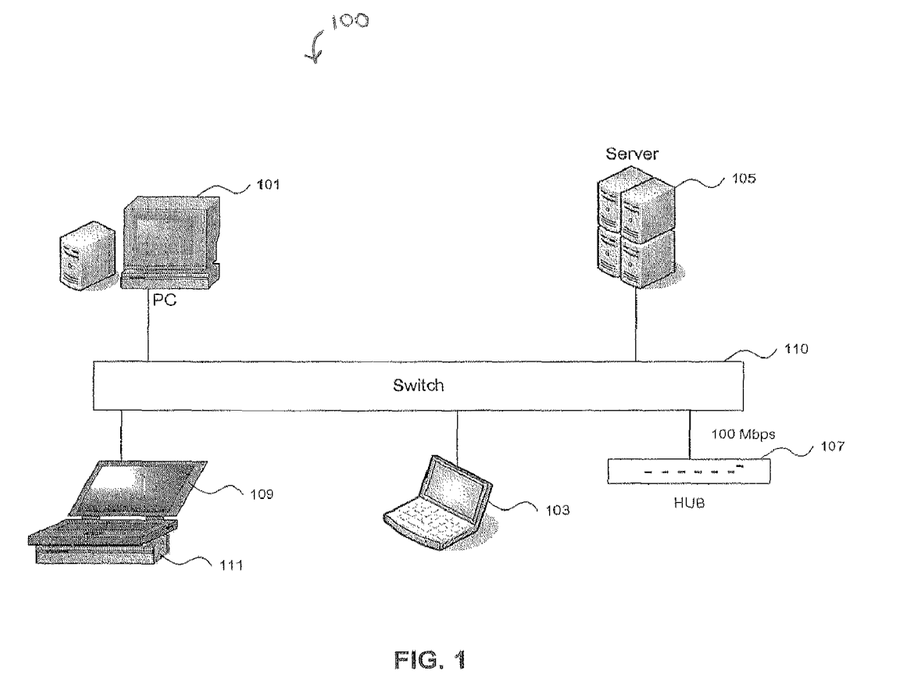
FIG. 1 illustrates an exemplary network environment.

FIG. 1 illustrates an exemplary network 100 in which notebooks 103 and 109 may operate. Network 100 may include a personal computer 101, a server 105, a data hub 107, a docking station 111, and a network switch 110. Switch 110 enables computer 101 to communicate with notebook 103, server 105, or hub 107. Switch 110 also enables notebook 103, server 105, and hub 107 to communicate with any other computer systems connected to the switch. Although not shown, computers 101 and 103, server 105, or hub 107 can be connected to other network systems such as LAN, WAN, or the internet.

On a high level, when data is received by switch 110 from computer 101, the data is examined to determine the data's destination address. Once the destination address and sending instructions are extracted, switch 110 makes a decision on where to send the received data. For example, computer 101 may want to send data only to server 105. In such a case, switch 110 will forward data received from computer 101 to server 105. In another example, computer 101 may want to send data to computer 103 and server 105, in this scenario, switch 110 will forward data transmitted by computer 101 to both the computer 103 and server 105. One skilled in the art will recognize other scenarios based on the discussion given herein.

It should be noted that there are various types of switching devices. Each type of switching device is specifically designed to function at a particular OSI layer. At layer 1, these switching devices are called hubs or repeaters. The main function of a hub or a repeater is to broadcast incoming data to one or more ports or spokes of the hub. In addition to data broadcasting, the repeater also amplifies the original signal for re-transmission.

At layer 2, the switching device is often called a multiport bridge or more commonly a switch. Switches are designed to forward data based on a physical address known as media access controller (MAC) address embedded in the header of a data frame. Each network interface card (NIC) of a computer system or a switch has a unique 48-bit long MAC address that may look like "2E 1D AC 01 00 01." Using the MAC address, a switch is able to route data to other switches or to a computer system with a matching MAC addresses.

A layer 3 switching device is called a router. Routers forward data packages based on their destination network address or internet protocol (IP) address. Similar to layer 2 switches, layer 3 routers are capable of learning addresses and maintaining address tables for referencing data packages with corresponding destinations.

Notebook 103 may be connected to network 100 using a RJ45 network port or through a wireless Ethernet port. Notebook 109 is similarly configured, but is also configured to connect to network 100 through a docking station 111, which also has a RJ-45 port connected to network 100.

Figure 2:
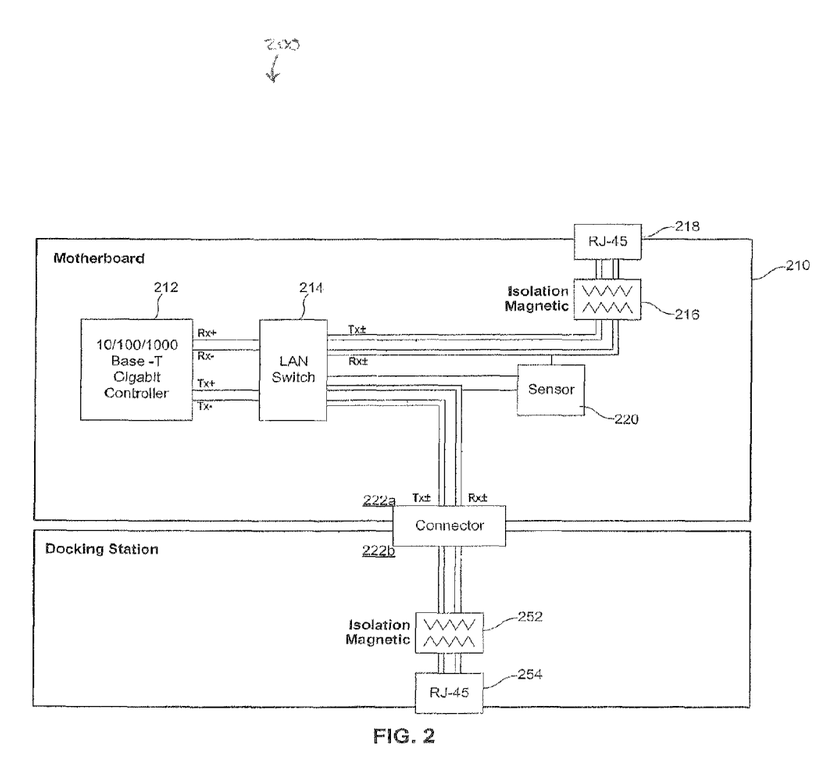
FIG. 2 illustrates a block diagram of an exemplary computer system.

FIG. 2 illustrates an exemplary computer system 200 that includes a notebook motherboard 210 and a docking station 250. Motherboard 210 includes physical layer device (PHY) 212, a switch 214, an isolation magnetic circuit 216, a RJ-45 connector port 218, and a link sensor 220. As shown, motherboard 210 is being implemented on notebook 109, but could also be implemented on notebook 103.

PHY 212 is responsible for transmitting and receiving data signals for the motherboard 210. During transmission, data signals that are received by switch 214, they are either forwarded to RJ-45 port 218 or a docking station communication port 222. Typically, a notebook motherboard includes a signal sensor such as sensor 220 to detect the presence of an active link, either at the RJ-45 connector 218 or at the docking station through the connector 222a. When sensor 220 detects an active link at communication port 222a, it notifies switch 214 to exclusively switch data signals between PHY 212 and communication port 222a. It should be noted that sensor 220 may also be integrated into switch 214. Similarly, when sensor 220 detects an active link at port 218, switch 214 is instructed to switch all data signals between PHY 212 and port 218.

To protect PHY 212 and other components of motherboard 210, data signals between PHY 212 and communication port 218 are filtered through an isolation magnetic circuit 216. In this manner, high voltage signals from the twisted pair cables may be filtered.

As shown in FIG. 2, docking station 250 includes communication port 222b, isolation magnetic circuit 252, and RJ-45 port 254. Communication port 222b is configured to mate with port 222a of motherboard 220. Similar to isolation magnetic circuit 216, isolation magnetic circuit 252 protects PHY 212 from potentially high voltage signals at port 254.

Figure 3:
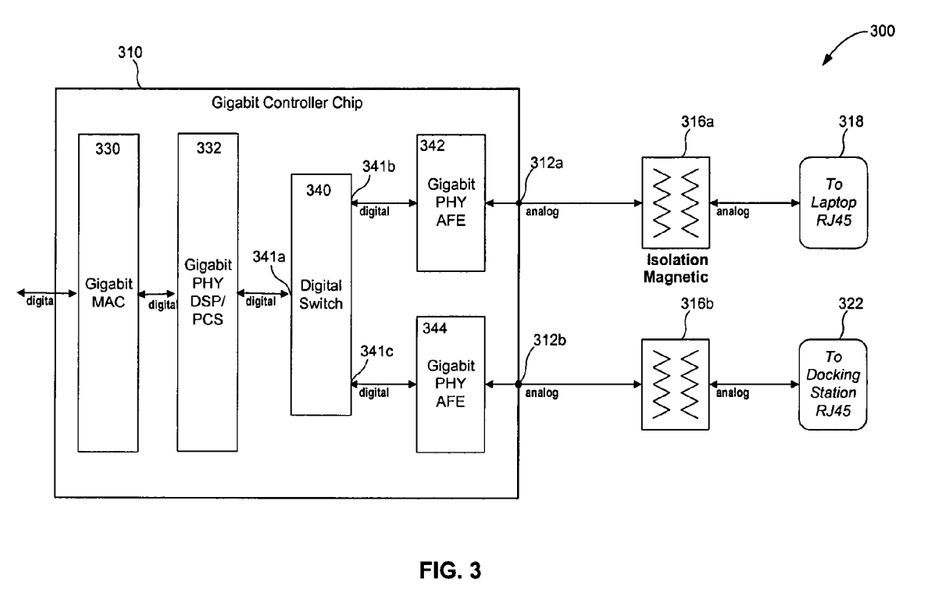
FIGS. 3-5 illustrate block diagrams of gigabit controller microprocessors according to embodiments of the present invention.

FIG. 3 illustrates a block diagram of a system 300 according to an embodiment of the present invention. System 300 includes a gigabit controller microprocessor 310, isolation magnetic circuits 316a-b, a RJ-45 port 318, and a docking station communication port 322. Isolation magnetic circuits 316a-b are coupled to input/output (I/O) ports 312a and 312b of gigabit controller 310. In this way, gigabit controller 310 is protected from high voltage signals at port 318 or port 322 and from other voltage anomalies. Alternatively, isolation magnetic circuit 316b can be physically located in the docking station instead of in system 300.

Gigabit controller 310 includes a media access controller (MAC) 330, a PHY digital signal processing (DSP) module 332, a digital switch 340, a first PHY analog front end (AFE) circuit 342, and a second PHY analog front end circuit 344. AFE circuits 342 and 344 are coupled to I/O ports 312a and 312b, respectively. Digital switch 340 is coupled between PHY DSP module 332 and AFE circuits 342 and 344. Switch 340 includes a first I/O port 341a, a second I/O port 341b, and a third I/O port 341c. I/O port 341a is coupled to PHY DSP 332. I/O port 341b is coupled to AFE circuit 342, and I/O port 341c is coupled to AFE circuit 344.

In an embodiment, PHY DSP module 332 comprises a physical coding sublayer (PCS) in accordance to the IEEE 802.3 standard.

In gigabit controller 310, AFE circuits 342 and 344 constantly monitor I/O ports 312a and 312b for link energy to determine which port is active. If a link energy is detected on port 312a, switch 340 will forward data between PHY DSP 332 and AFE circuit 342. If a link energy is detected on port 312b, switch 340 will forward data between PHY DSP 332 and AFE circuit 344. If both ports 312a and 312b are determined to be active, then switch 340 will only forward data between PHY DSP 332 and AFE circuit 344, which is coupled to a docking station communication port 322. Alternatively, if both ports 312a and 312b are active, then switch 340 will only forward data between PHY DSP 332 and AFE circuit 342.

Switch 340 is a bidirectional digital switch. In this way, data may be transferred from PHY DSP 332 to AFE circuit 342 or from AFE circuit 342 to PHY DSP 332. Switch 340 may have more than 2 possible switching paths, as opposed to only 2 switching paths shown. For example, gigabit controller 310 may have "n" number of communication port similar to port 312. In this scenario, gigabit controller 310 would have a corresponding "n" number of AFE, one for each communication port. Further, switch 340 may be implemented to work with a 10Base-T, 100Base-TX, 1000Base-T Ethernet system, or other communication standards. In an embodiment, switch 340 is a bidirectional digital multiplexer. It should be noted that other switching implementations could also be used to switch digital signals between PHY DSP 332 and AFE 342 or AFE 344. Further, the implementation of a digital switch to switch digital signals between a first circuit and a plurality of second circuits is apparent to one skilled in the relevant art.

The design of system 300 eliminates the need for an off-chip switch 214 between gigabit controller 310 and ports 318 and 322. The elimination of switch 214 reduces power consumption and the cost of system 300. Further, without the off-chip switch, circuit designers no longer have to worry about impedance mismatch at the interface of the PHY's AFE and the off-chip switch, which may cause signal distortions and amplitude lost, for example. Additionally, when an off-chip switch is used, the PHY has to be driven at a higher power level to offset for amplitude lost.

Further, the integrated switch of system 300 allows gigabit controller 310 to achieve higher cable reach as compared to system 200, which is partly contributed by the elimination of hybrid mismatch and transmit distortion caused by an off-chip switch.

Figure 4:
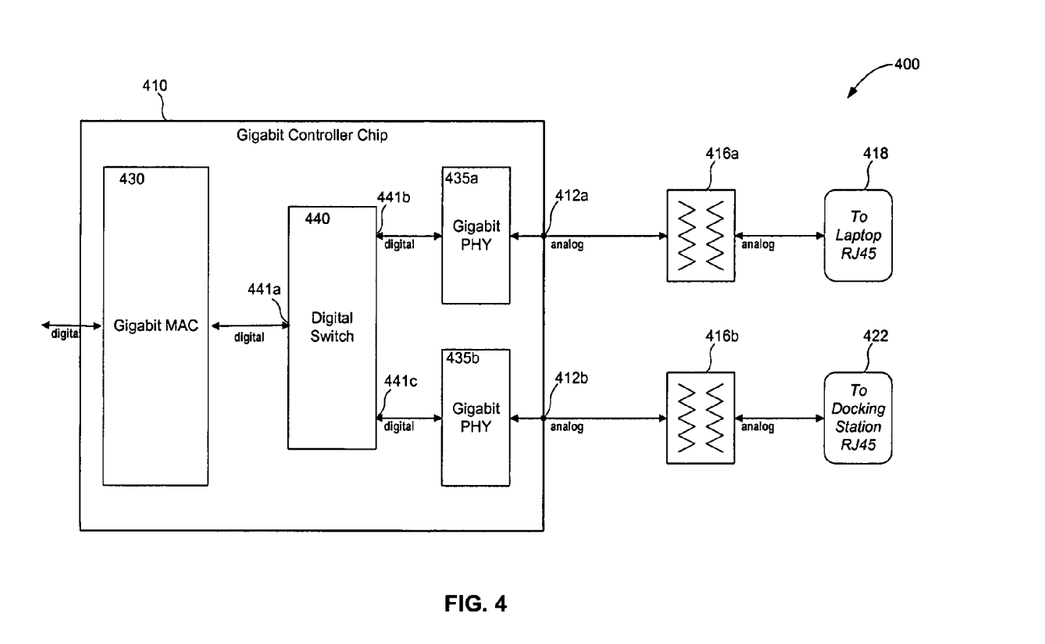

FIG. 4 illustrates a block diagram of a system 400 according to an embodiment of the present invention. System 400 includes gigabit controller microprocessor 410, isolation magnetic circuits 416a-b, a RJ-45 port 418, and a docking station communication port 422. Isolation magnetic circuits 416a-b are coupled to input/output (I/O) ports 412a and 412b of gigabit controller 410. In this manner, isolation magnetic circuits 416a-b can protect gigabit controller 410 from high voltage signals at port 418 or port 422.

Gigabit controller 410 includes a media access controller (MAC) 430, a first PHY module 435a, a second PHY module 435b, and digital switch 440. PHY modules 435a and 435b, each includes its own AFE circuitry (not shown) for communicating with port 418 or port 422. Although only two PHY modules are shown, gigabit controller 410 may have more than two PHY modules connected to switch 440. Each of the PHY modules I/O port will also be connected to an isolation magnetic circuit prior to coupling with a network communication port (e.g., port 422). Although not shown, PHY module 435a includes its own PHY DSP 332 and AFE circuit 342.

Similar to switch 340, switch 440 is a bidirectional gigabit digital switch. In this way, data may be transferred from MAC 430 to PHY 435a or from PHY 435a to MAC 430. Switch 440 may have 2 or more switching paths. For example, gigabit controller 410 may have "n" number of communication port similar to port 412 and "n" number of AFE, one for each communication port. Further, switch 440 may be implemented to work with a 10Base-T, 100Base-TX, or 1000Base-T system. In an embodiment, switch 440 is a bidirectional digital multiplexer. The implementation of a digital switch to switch digital signals between a plurality of circuits is apparent to persons skilled in the relevant art.

Digital switch 440 is coupled between MAC 430 and PHY modules 435a-b. Switch 440 includes a first I/O port 441a, a second I/O port 441b, and a third I/O port 441c. I/O port 441a is coupled to MAC 430. I/O port 441b is coupled to PHY module 435a, and I/O port 441c is coupled to PHY module 435b.

PHYs 435a and 435b are configured to monitor I/O ports 412a and 412b for link energy. If link energy is detected on port 412a, switch 440 will forward data between MAC 430 and PHY 435a. If link energy is detected on port 412b, switch 440 will forward data between MAC 430 and PHY 435b. If both ports 412a and 412b are determined to be active, then switch 440 will only forward data between MAC 430 and PHY 435b, which is coupled to a docking station communication port 422.

Figure 5:
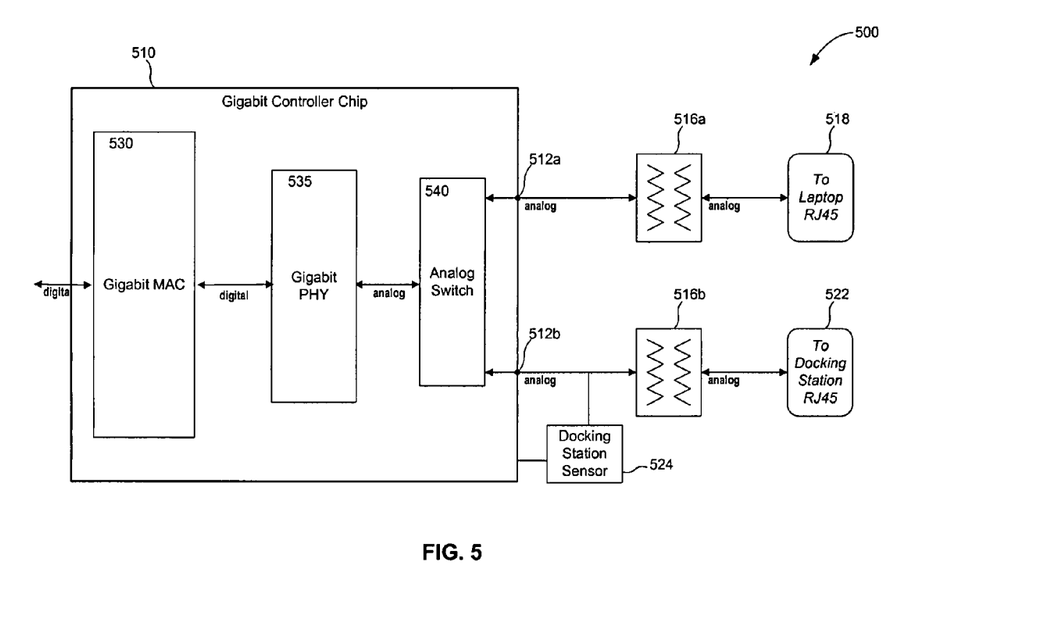

FIG. 5 illustrates a block diagram of a computer system 500 according an embodiment of the present invention. System 500 includes a gigabit controller chip that comprises a gigabit MAC 530, a gigabit PHY 535, and an analog switch 540. System 500 further includes a plurality of isolation magnetic circuits 516a-b, a RJ-45 communication port 518, a docking station communication port 522, and a docking station sensor 524.

Analog switch 540 is a high speed analog multiplexer configured to switch analog data signals between a plurality of circuits. Implementation of an analog switch or multiplexer should be apparent to one skilled in the relevant art. As shown in FIG. 5, switch 540 is integrated into gigabit controller chip 510. In this manner, impedance matching between the PHY's AFE and the switch may be done accurately at chip level, and thus help to reduce signal distortions and amplitude loss. It should be noted that implementation of an analog switch to switch analog signals between a plurality of circuits is apparent to one skilled in the art. Further, switch 540 may have 2 or more switching paths (e.g. multiple UTP paths). Switch 540 may also be implemented to work with a 10Base-T, 100Base-TX, or 1000Base-T Ethernet system, or other communication systems.

Switch 540 has two I/O communication ports coupled to gigabit controller 510 I/O ports 512a and 512b and an I/O port coupled to PHY 535. When sensor 524 detects a link energy on port 522, it causes switch 540 to only switch data between PHY 535 and port 522. If no link energy is detected on port 522, switch 540 is configured to switch data between PHY 535 and port 518.

Similar to isolation magnetic circuits 416a and 416b, isolation magnetic circuits 516a and 516b are present to protect gigabit controller chip 510 from voltage anomalies at port 518 or port 522.

Figure 6:
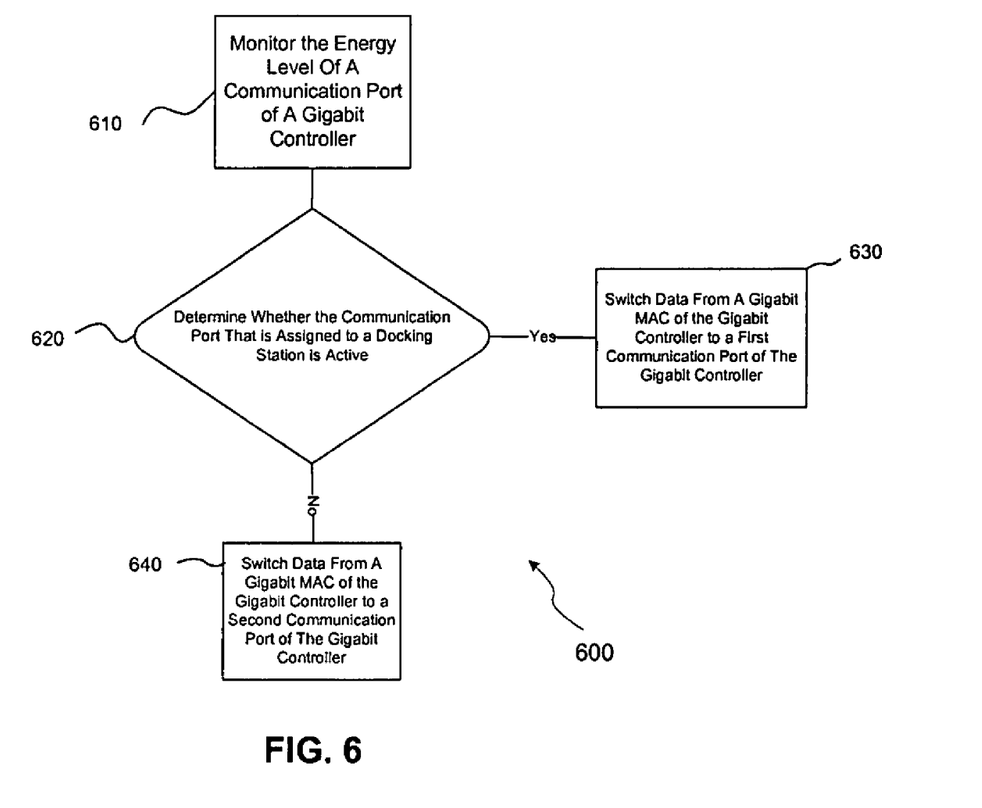
FIG. 6 illustrates a method for switching data between a docking station I/O port and a stand-alone connector port, according to embodiments of the invention.

FIG. 6 illustrates a method 600 for switching data between a docking station I/O port and a stand-alone connector port within a Gigabit controller, without the need for a separate LAN switch. Method 600 may be implemented in Gigabit controller 310, 410, or 510. In step 610, Gigabit controller 310 monitors at least one of its input and output (I/O) ports. In an embodiment, Gigabit controller 310 only monitors I/O port 312b, which is coupled to a notebook docking station. Alternatively, Gigabit controller 310 may monitor all of its I/O ports.

In step 620, Gigabit controller 310 determines whether I/O port 312b is active by measuring the energy level of the port. This may be done by measuring the voltage level of port 312b, for example.

In step 630, Gigabit controller 310 switches data between Gigabit MAC 330 and I/O port 312b if it has determined that port 312b is active.

In step 630, Gigabit controller 310 switches data between Gigabit MAC 330 and I/O port 312a if it has determined that port 312b is inactive. In this way, the need for an off-chip switch between gigabit controller 310 and ports 318 and 322 is eliminated. This helps to reduce power consumption and cost. As a further benefit to internal switching, gigabit controller 310 may achieve higher cable reach as compared to system 200.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

I claim:

1. An integrated circuit comprising:
a media access controller (MAC);
a digital signal processing module configured to receive an information signal from the MAC and to output a processed signal;
a first analog front end (AFE) having a first communication port;
a second AFE having a second communication port; and
a digital switch configured to receive the processed signal, wherein the digital switch selectively forwards the processed signal to either the first AFE or the second AFE based on whether a communication link at either the first communication port or the second communication port is established, wherein the processed signal is converted from digital to analog by one of the first AFE or the second AFE.

2. The integrated circuit of claim 1, wherein second AFE is configured to detect the communication link at the second communication port.

3. The integrated circuit of claim 1, wherein the digital switch forwards the processed signal to the second AFE when the communication link at the second communication port is active.

4. The integrated circuit of claim 1, wherein the digital switch forwards the processed signal to the first AFE when the communication link at the first communication port is active.

5. The integrated circuit of claim 1, wherein the second communication port is coupled to an external device such as a notebook docking station.

6. The integrated circuit of claim 1, wherein the digital switch is a digital multiplexer.

7. The integrated circuit of claim 1, wherein the first communication port is coupled to a communication connector.

8. An integrated circuit, comprising:
a media access controller (MAC);
a first physical layer module (PHY);
a second PHY;
a digital switch having an input coupled to the MAC, a first output coupled to the first PHY, and a second output coupled to the second signal PHY, wherein the digital switch is configured to forward information received from the MAC to either the first or second PHY based on whether a communication port of the second PHY is active, wherein the information is converted from digital to analog by one of the first AFE or the second AFE.

9. The integrated circuit of claim 8, wherein the digital switch is a digital multiplexer.

10. The integrated circuit of claim 8, wherein the digital switch forwards the information to the second PHY when the communication port of the second PHY is active.

11. The integrated circuit of claim 8, wherein the digital switch forwards the information to the first PHY when the communication port of the first PHY is active.

12. The integrated circuit of claim 8, wherein the communication port of the second PHY is coupled to a docking station.

13. The integrated circuit of claim 8, wherein the communication port of the first PHY is coupled to a RJ-45 connector.

14. The integrated circuit of claim 1, wherein the MAC, digital signal processor, digital switch, and first and second AFEs are all integrated on the integrated circuit.

15. The integrated circuit of claim 1, wherein outputs of the digital switch are directly connected to respective inputs of the first and second AFEs.

16. The integrated circuit of claim 15, wherein an input of the digital switch is directly connected to an output of the digital signal processor.

17. The integrated circuit of claim 1, wherein the MAC, digital signal processor, digital switch, and first and second AFEs are all integrated on a common substrate of the integrated circuit.

18. An integrated circuit comprising:
a media access controller (MAC);
a digital signal processing module configured to receive an information signal from the MAC and to output a processed signal;
a first analog front end (AFE) having a first communication port;
a second AFE having a second communication port; and
a digital switch having an input directly connected to an output of the digital signal processing module and respective outputs directly connected to respective inputs of the first and second AFEs, wherein the digital switch selectively forwards the processed signal to either the first AFE or the second AFE based on whether a communication link at either the first communication port or the second communication port is established, wherein the processed signal is converted from digital to analog by one of the first AFE or the second AFE.

19. The integrated circuit of claim 18, wherein the MAC, digital signal processor, first and second AFEs, and digital switch are implemented on a single integrated circuit chip.

20. The integrated circuit of claim 19, wherein the processed signal is a digital signal.

* * * * *